United States Patent
Reimchen

(10) Patent No.: US 11,920,642 B2
(45) Date of Patent: Mar. 5, 2024

(54) ROLLER FREEWHEEL UNIT FOR A VEHICLE

(71) Applicant: Schaeffler Technologies AG & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/775,930

(22) PCT Filed: Nov. 5, 2020

(86) PCT No.: PCT/DE2020/100949
§ 371 (c)(1),
(2) Date: May 11, 2022

(87) PCT Pub. No.: WO2021/110200
PCT Pub. Date: Jun. 10, 2021

(65) Prior Publication Data
US 2022/0381302 A1 Dec. 1, 2022

(30) Foreign Application Priority Data

Dec. 5, 2019 (DE) ...................... 10 2019 133 200.1

(51) Int. Cl.
*F16D 41/067* (2006.01)

(52) U.S. Cl.
CPC .... *F16D 41/067* (2013.01); *F16D 2250/0084* (2013.01); *F16D 2300/06* (2013.01)

(58) Field of Classification Search
CPC .......... F16D 41/067; F16D 2250/0084; F16D 2300/12; F16D 2300/06
See application file for complete search history.

(56) References Cited

U.S. PATENT DOCUMENTS

| | | | |
|---|---|---|---|
| 5,941,355 A | 8/1999 | Iga | |
| 9,784,324 B2 * | 10/2017 | Reimchen | F16D 41/067 |
| 9,784,325 B2 * | 10/2017 | Hodge | F16D 41/067 |
| 9,856,927 B2 * | 1/2018 | Reimchen | F16D 41/04 |
| 10,935,085 B2 * | 3/2021 | Geiser | F16D 41/066 |

(Continued)

FOREIGN PATENT DOCUMENTS

| | | |
|---|---|---|
| CN | 1740584 A | 3/2006 |
| CN | 101021234 A | 8/2007 |

(Continued)

*Primary Examiner* — Huan Le

(57) ABSTRACT

A roller freewheel unit for a vehicle includes an outer sleeve element, an inner ring element and a cage element for accommodating spring/roller elements. The inner ring element has at least one radially protruding sliding shoe element, which can be inserted into a corresponding receptacle of the cage element in the axial direction in order to interconnect the inner ring element and the cage element. The inner ring element may have multiple sliding shoe elements arranged on the circumference of the inner ring element, and the cage element may have correspondingly arranged receptacles. The outer sleeve element may be slid onto outer surfaces of the sliding shoe elements in such a manner that the outer sleeve element is centered and supported by the sliding shoe elements.

16 Claims, 2 Drawing Sheets

(56) References Cited

U.S. PATENT DOCUMENTS

2013/0299294 A1* 11/2013 Doerrie ................. F16D 41/07
                                                    192/108
2016/0215826 A1*  7/2016 Reimchen ............. F16D 41/067

FOREIGN PATENT DOCUMENTS

| CN | 101178099 A | 5/2008 |
| CN | 105830309 A | 8/2016 |
| CN | 108050220 A | 5/2018 |
| CN | 109424634 A | 3/2019 |
| DE | 102005061791 A1 | 7/2007 |
| DE | 202015101730 U1 | 4/2015 |
| DE | 102015201403 A1 | 7/2016 |
| DE | 102015222301 A1 | 5/2017 |
| GB | 1182378 A | 2/1970 |
| JP | 2002349677 A | 12/2002 |
| JP | 2008185048 A | 8/2008 |
| JP | 2012159105 A | 8/2012 |
| JP | 2019196810 A | 11/2019 |
| WO | 2014157236 A1 | 10/2014 |

* cited by examiner

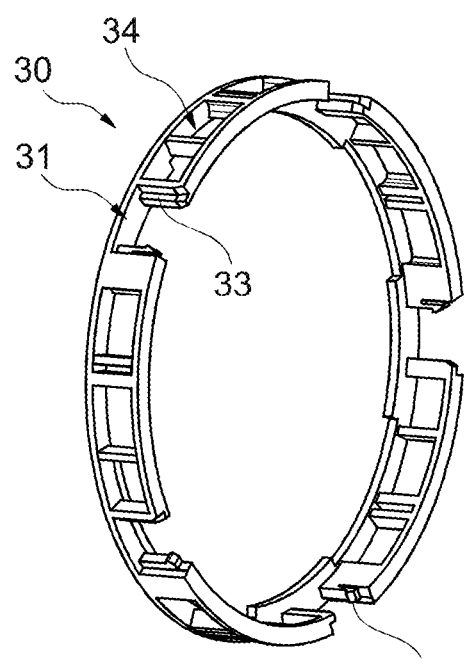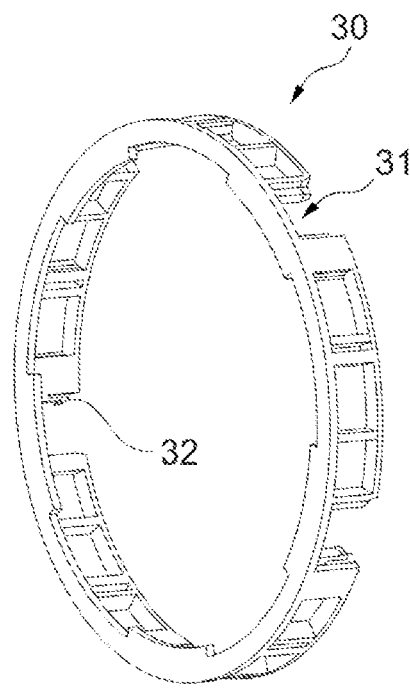
Fig. 3a  Fig. 3b
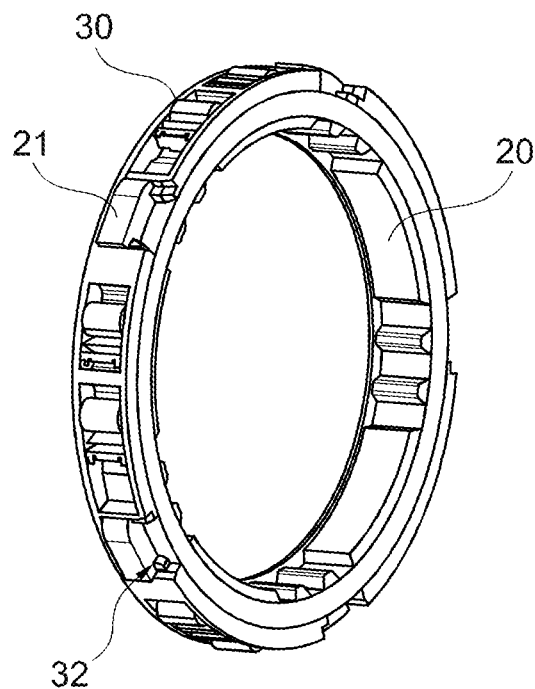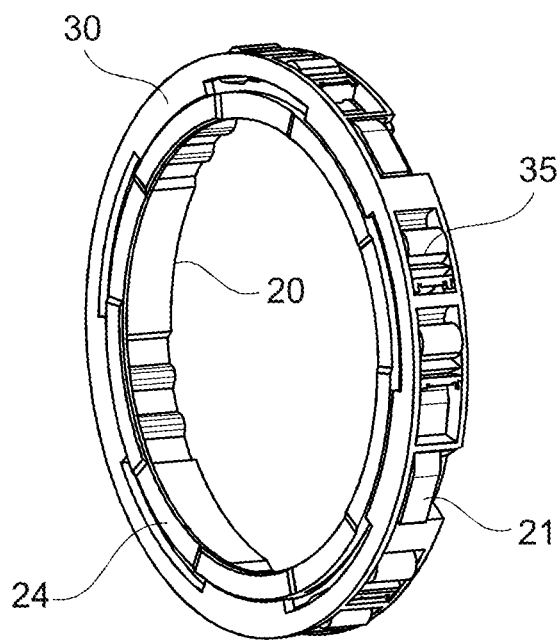
Fig. 4a  Fig. 4b

ROLLER FREEWHEEL UNIT FOR A VEHICLE

CROSS-REFERENCE TO RELATED APPLICATIONS

This application is the United States National Phase of PCT Appln. No. PCT/DE2020/100949 filed Nov. 5, 2020, which claims priority to German Application No. DE1019133200.1 filed Dec. 5, 2019, the entire disclosures of which are incorporated by reference herein.

TECHNICAL FIELD

The present disclosure relates to a roller freewheel unit for a vehicle, a method for assembling such a roller freewheel unit, a vehicle having such a roller freewheel unit, and the use of such a roller freewheel unit in a vehicle.

BACKGROUND

Roller freewheel units are known, in principle, from the prior art, and are used in particular in automatic transmissions in a wide variety of designs. In addition to the actual function of the freewheel, the design of a freewheel unit must take into account the respective connection options of the freewheel unit to the surrounding parts, such as housing parts, shaft elements, bearing arrangements and the like. In addition, sufficient lubrication and, lastly, the most cost-effective production possible should be provided.

SUMMARY

A roller freewheel unit for a vehicle according to the disclosure includes: an outer sleeve element; an inner ring element; and a cage element for accommodating spring/roller elements. The inner ring element includes at least one radially protruding sliding shoe element, which can be inserted into a corresponding receptacle of the cage element in the axial direction in order to interconnect the inner ring element and the cage element.

In other words, the present disclosure proposes a substantially three-piece roller freewheel unit which can be used together in the axial direction. A centering and guiding function is provided by the sliding shoe elements, so that a roller freewheel unit according to the disclosure can be assembled comparatively easily.

The inner ring element includes a plurality of sliding shoe elements arranged on the circumference of the inner ring element, and the cage element includes correspondingly arranged receptacles. The outer sleeve element is slid onto outer surfaces of the sliding shoe elements in such a manner that the outer sleeve element is centered and supported by the sliding shoe elements.

The inner ring element may have at least one spline on the inside in order to connect the roller freewheel unit to a shaft in a non-rotatable manner. Such splines can provide a quick connection of the roller freewheel unit to a corresponding shaft, and several splines can be provided depending on the torque provided.

Furthermore, the inner ring element and/or the cage element may have at least one oil guiding surface on the end face. The cage element includes at least one latching means which latches with a correspondingly formed contact surface of the inner ring element in the connected state, in order to secure the cage element and the inner ring element in the axial direction. A plurality of latching means may be provided, which may each be provided on one side of the receptacles of the cage element and each latch with a contact surface of the sliding shoe elements.

The cage element may have circumferentially arranged recesses for accommodating the spring/roller elements. The outer sleeve element may be provided as a hardened deep-drawn component, the cage element may be provided as a plastic component, and the inner ring element may be provided as a sintered component.

In addition, the present disclosure relates to a method for assembling a roller freewheel unit, including the following steps: Providing a roller freewheel unit; Connecting the cage element to the inner ring element by inserting the sliding shoe elements of the inner ring element into the correspondingly fainted receptacles of the cage element in the axial direction; Arranging the spring/roller elements in the recesses for accommodating the spring/roller elements; and Inserting the cage element connected to the inner ring element into the outer sleeve element. The outer sleeve element is centered and supported by the sliding shoe elements.

Furthermore, the present disclosure relates to a vehicle including an internal combustion engine and an electric motor. The internal combustion engine and the electric motor are coupled to at least one roller freewheel unit described above, and the roller freewheel unit is configured to decouple the internal combustion engine from the electric motor during exclusively electric driving operation.

The present invention also relates to the use of a roller freewheel unit described above in a vehicle for coupling an internal combustion engine and an electric motor. The roller freewheel unit is configured to decouple the internal combustion engine from the electric motor during exclusively electric driving operation.

BRIEF DESCRIPTION OF THE DRAWINGS

Further features and possible applications of the present disclosure result from the following description, the exemplary embodiment and the figures. In the figures:

FIGS. 3a/3b show schematic views of a cage element of a roller freewheel unit; and FIGS. 4a/4b show schematic views of a cage element connected to the inner ring element.

DETAILED DESCRIPTION

Figure 1A:
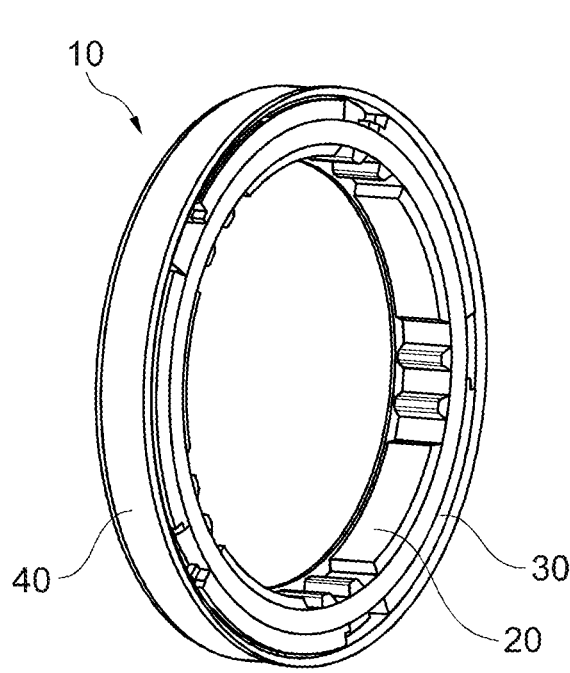
FIGS. 1a/1b show schematic views of an example embodiment of a roller freewheel unit.
Figure 1B:
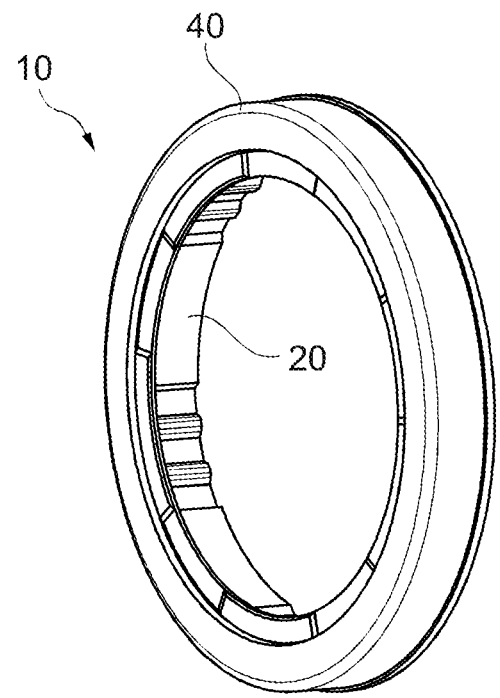

FIGS. 1a and 1b show two schematic views of an example embodiment of a roller freewheel unit 10 according to the disclosure. The roller freewheel unit 10 includes an inner ring element 20, a cage element 30, and an outer sleeve element 40. The shown roller freewheel unit 10 can be used, for example, as a coupling for coupling an internal combustion engine to an electric motor in hybrid vehicles, e.g., to decouple an internal combustion engine from the electric motor in an exclusively electric driving mode. In the figures, for the sake of clarity, only one element of each of the radially or circumferentially arranged elements has been given a reference symbol.

Figure 2A:
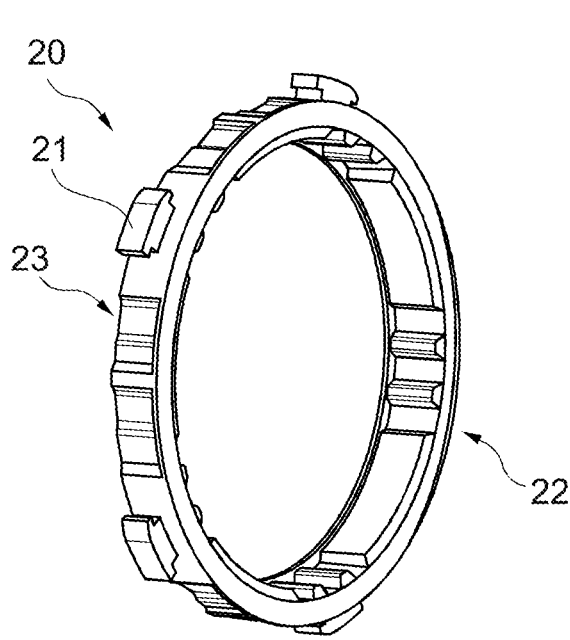
FIGS. 2a/2b show schematic views of an inner ring element of a roller freewheel unit.
Figure 2B:
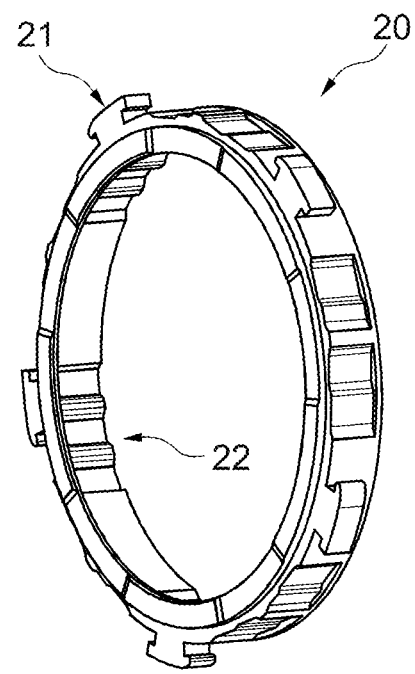

FIGS. 2a and 2b show two schematic views of the inner ring element 20 of the roller freewheel unit 10 shown in FIGS. 1a/1b. The inner ring element 20 includes a plurality of sliding shoe elements 21 arranged on the outer circumference, and, in the embodiment shown, five sliding shoe elements 21 are uniformly provided on the outer circumference of the inner ring element 20. The inner ring element 20 also includes a plurality of axially inner splines 22, which are provided for connection to a correspondingly formed toothing of a shaft of a motor in a non-rotatable manner. In addition, the inner ring element 20 includes a plurality of clamping ramps 23 provided on the outer circumference using which the rollers (see FIGS. 4a and 4b) of the roller freewheel unit 10 can interact in a known manner to either couple the outer sleeve element 40 and the inner ring element 20 in a non-rotatable manner or to provide a corresponding freewheel. As can be seen clearly in FIGS. 2a and 2b, the sliding shoe elements 21 can also be of asymmetrical design, i.e. they have a leg which is chamfered, for example in order to be brought into contact with a corresponding surface of the cage element 30 (see FIGS. 4a and 4b). The radially outer surfaces of the sliding shoe elements 21 serve as a contact surface for the outer sleeve element 40, and the evenly distributed arrangement of the sliding shoe elements 21 can provide a centering and bearing of the outer sleeve element 40.

FIGS. 3a and 3b show two schematic views of the cage element 30 of the roller freewheel unit 10 shown in FIGS. 1a/1b.

The cage element 30 includes receptacles 31 into which the sliding shoe elements 21 of the inner ring element 20 can be inserted by pushing both elements onto one another in the axial direction. As can be seen clearly in FIGS. 3a and 3b, the cage element 30 includes latching elements 32 on one side of the receptacles 31, which in the embodiment shown are snap-on lugs 32. These latching elements 32 can engage behind the sliding shoe elements 21 in the axial direction and thus secure both parts in the axial direction (see FIG. 4a). Furthermore, further guide surfaces or guide grooves 33 can be provided on the side of the receptacles 31 opposite the latching elements 32. The cage element 30 includes recesses 34 for accommodating the spring/roller elements 35 (see FIG. 4b). FIGS. 4a and 4b show two schematic views of the pre-assembly formed by an inner ring element 20 and a cage element 30, which can then be inserted into the outer sleeve element 40. As can be seen particularly well in FIG. 4b, the inner ring element 20 can include oil guiding surfaces 24 or oil guiding geometries 24 provided on the end face, which serve to introduce lubricants.

A roller freewheel unit 10 according to the disclosure may be assembled in such a manner that the cage element 30 is first connected to the inner ring element 20 by sliding the sliding shoe elements of the inner ring element 20 into or onto the correspondingly formed receptacles of the cage element 30 in the axial direction. The spring/roller elements are then inserted into the recesses for accommodating the spring/roller elements. Finally, a pre-assembly formed in this manner is slid onto the outer sleeve element 40, and the outer sleeve element 40 is centered and supported by the sliding shoe elements.

The present disclosure is not limited to the exemplary embodiments.

REFERENCE NUMERALS

10 Roller freewheel unit
20 Inner ring element
21 Sliding shoe element
22 Splines
23 Clamping ramps
24 Oil guiding surfaces
30 Cage element
31 Receptacles
32 Latching elements
33 Guide grooves
34 Recesses
35 Spring/roller elements
40 Outer sleeve element

The invention claimed is:

1. A roller freewheel unit for a vehicle, comprising:
an outer sleeve element;
an inner ring element; and
a cage element for accommodating spring/roller elements, wherein:
the inner ring element comprises multiple radially protruding sliding shoe elements, arranged on a circumference of the inner ring element, which can be inserted into a correspondingly arranged receptacles of the cage element in an axial direction in order to interconnect the inner ring element and the cage element; and
the outer sleeve element is slid onto outer surfaces of the sliding shoe elements in such a manner that the outer sleeve element is centered and supported by the multiple radially protruding sliding shoe elements.

2. The roller freewheel unit according to claim 1, wherein the inner ring element comprises at least one spline on an inside in order to connect the roller freewheel unit to a shaft in a non-rotatable manner.

3. The roller freewheel unit according to claim 1, wherein the inner ring element or the cage element comprises at least one oil guiding surface on an end face.

4. The roller freewheel unit according to claim 1, wherein the cage element comprises at least one latching means which latches with a correspondingly formed contact surface of the inner ring element in the connected state, in order to secure the cage element and the inner ring element in the axial direction, wherein multiple latching means are provided, which are each provided on one side of the receptacles of the cage element and each latch with a contact surface of the sliding shoe elements.

5. The roller freewheel unit according to claim 1, wherein the cage element comprises circumferentially arranged recesses for accommodating the spring/roller elements.

6. The roller freewheel unit according to claim 1, wherein the outer sleeve element is provided as a hardened deep-drawn component, the cage element is provided as a plastic component, and the inner ring element is provided as a sintered component.

7. A method for assembling a roller freewheel unit, comprising:
providing a roller freewheel unit according to claim 1;
connecting the cage element to the inner ring element by inserting the sliding shoe elements of the inner ring element into the correspondingly formed receptacles of the cage element in the axial direction;
arranging the spring/roller elements in recesses for accommodating the spring/roller elements; and
inserting the cage element connected to the inner ring element into the outer sleeve element, wherein the outer sleeve element is centered and supported by the sliding shoe elements.

8. A vehicle comprising an internal combustion engine and an electric motor, wherein the internal combustion engine and the electric motor are coupled to at least one roller freewheel unit according to claim 1, and the roller freewheel unit is configured to decouple the internal combustion engine from the electric motor during exclusively electric driving operation.

9. A use of a roller freewheel unit according to claim 1 in a vehicle for coupling an internal combustion engine and an electric motor, wherein the roller freewheel unit is configured to decouple the internal combustion engine from the electric motor during exclusively electric driving operation.

10. A roller freewheel unit for a vehicle, comprising:
an outer sleeve element;
a cage element for accommodating spring/roller elements, the cage element comprising a receptacle and a snap-on lug; and
an inner ring element comprising a radially protruding sliding-shoe element axially inserted into the receptacle to interconnect the inner ring element and the cage element, the sliding-shoe element comprising a contact surface latched in the snap-on lug to axially secure the cage element to the inner ring element.

11. The roller freewheel unit of claim 10 wherein:
the inner ring element comprises multiple sliding shoe elements arranged on a circumference of the inner ring element, each of the multiple sliding shoe elements comprising a respective outer surface;
the cage element comprises correspondingly arranged receptacles; and
the outer sleeve element is slid onto the respective outer surfaces to center and support the outer sleeve element on the multiple sliding shoe elements.

12. The roller freewheel unit of claim 10, wherein the inner ring element further comprises an inside spline arranged to connect the roller freewheel unit to a shaft in a non-rotatable manner.

13. The roller freewheel unit of claim 10, wherein the inner ring element or the cage element comprises an end face with an oil guiding surface.

14. The roller freewheel unit of claim 10, wherein:
the inner ring element comprises multiple sliding shoe elements with respective contact surfaces; and
the cage element comprises multiple receptacles and multiple snap-on lugs;
each of the multiple snap-on lugs is arranged on a same circumferential side of a respective one of the multiple receptacles; and
each of the respective contact surfaces is latched in a respective one of the multiple snap-on lugs.

15. The roller freewheel unit of claim 10, wherein the cage element comprises circumferentially arranged recesses for accommodating the spring/roller elements.

16. The roller freewheel unit of claim 10, wherein:
the outer sleeve element is a hardened deep-drawn component;
the cage element is a plastic component; and
the inner ring element is a sintered component.

\* \* \* \* \*